United States Patent [19]

Bookbinder et al.

[11] Patent Number: 5,475,784
[45] Date of Patent: Dec. 12, 1995

[54] METHOD OF ENCAPSULATING OPTICAL COMPONENTS AND PRODUCTS PRODUCED BY THAT METHOD

[75] Inventors: Dana C. Bookbinder, Corning, N.Y.; Thierry L. Dannoux, Avon, France; Lung-Ming Wu, Horseheads, N.Y.

[73] Assignee: Corning Incorporated, Corning, N.Y.

[21] Appl. No.: 380,455

[22] Filed: Jan. 27, 1995

Related U.S. Application Data

[63] Continuation of Ser. No. 47,100, Apr. 13, 1993, abandoned.

[51] Int. Cl.$^6$ ..................................................... G02B 6/30
[52] U.S. Cl. ..................... 385/94; 385/14; 385/15; 385/49; 385/92; 385/129; 385/131; 385/141
[58] Field of Search .................................. 385/14, 15, 31, 385/39, 43, 49, 88, 89, 92, 94, 99, 129, 130, 131, 132, 141, 143, 145, 128

[56] References Cited

U.S. PATENT DOCUMENTS

| | | | |
|---|---|---|---|
| 3,825,318 | 7/1974 | Croset et al. | 385/13 X |
| 3,833,284 | 9/1974 | Kaminow et al. | 385/132 X |
| 3,883,221 | 5/1975 | Rigrod | 385/36 X |
| 3,957,341 | 5/1976 | Taylor | 385/42 X |
| 4,082,419 | 4/1978 | Thompson et al. | 385/42 X |
| 4,089,585 | 5/1978 | Slaughter et al. | 385/100 X |
| 4,227,769 | 10/1980 | Phillips et al. | 385/36 X |
| 4,336,047 | 6/1982 | Pavlopoulos et al. | 65/331 |
| 4,413,881 | 11/1983 | Kovats | 385/92 X |
| 4,485,122 | 11/1984 | Williams et al. | 427/163 X |
| 4,531,809 | 7/1985 | Carter et al. | 385/36 X |
| 4,609,437 | 9/1986 | Kruishoop et al. | 204/28 |
| 4,687,293 | 8/1987 | Randazzo | 385/128 |
| 4,695,125 | 9/1987 | Sinclair et al. | 385/140 X |
| 4,707,069 | 11/1987 | Hoffman | 385/39 X |
| 4,714,316 | 12/1987 | Moore et al. | 385/39 X |
| 4,792,200 | 12/1988 | Amann et al. | 385/133 X |
| 4,897,711 | 1/1990 | Blonder et al. | 385/88 |
| 4,906,068 | 3/1990 | Olson et al. | 385/11 X |
| 5,042,896 | 8/1991 | Dahlgren | 385/11 X |
| 5,048,919 | 9/1991 | Ladany | 385/49 |
| 5,061,035 | 10/1991 | Rodgers, Jr. | 385/128 |
| 5,076,657 | 12/1991 | Toya et al. | 385/99 X |
| 5,091,989 | 2/1992 | Dannoux | 385/70 |
| 5,165,005 | 11/1992 | Klainer et al. | 385/129 |
| 5,168,541 | 12/1992 | Booth | 385/129 |
| 5,210,800 | 5/1993 | Asai et al. | 385/14 |
| 5,283,852 | 2/1994 | Gibler et al. | 385/136 |

FOREIGN PATENT DOCUMENTS

| | | | |
|---|---|---|---|
| 1151277 | 8/1983 | Canada | 385/92 X |
| 0021473 | 1/1981 | European Pat. Off. | 385/33 X |
| 0285784 | 2/1988 | European Pat. Off. | 385/99 X |
| 261073 | 10/1988 | Germany | 385/88 X |
| 58-2811 | 8/1983 | Japan | 385/100 X |
| 60-107007 | 12/1985 | Japan | 385/42 X |
| 1-118810 | 11/1989 | Japan | 385/99 X |
| 89/10904 | 11/1989 | WIPO | 385/128 X |

*Primary Examiner*—Brian Healy
*Attorney, Agent, or Firm*—Brian R. Leslie; Jay M. Brown

[57] ABSTRACT

A method of encapsulating an optical component, the component comprising at least partially uncoated organic material, the method comprising: placing molten metal around the optical component, and solidifying the metal. The invention includes encapsulating a segment or element of an optical component, such as, for example, an optical junction or a surface. An encapsulated optical component and optical components having sealed or encapsulated elements are also provided.

7 Claims, 4 Drawing Sheets

METHOD OF ENCAPSULATING OPTICAL COMPONENTS AND PRODUCTS PRODUCED BY THAT METHOD

This is a continuation of copending application Ser. No. 08/047,100 filed on Apr. 13 1993, now abandoned.

BACKGROUND OF THE INVENTION

1. Field of the Invention

The present invention relates to methods of encapsulating optical components and products produced by those methods.

2. History of the Prior Art

Optical components are exposed to a wide variety of detrimental environmental influences during use. Environmental influences may cause physical, chemical or optic damage to an optical component. For example, one kind of planar optical fiber coupler is comprised of optical fibers that .ire precision aligned and fastened via adhesive, typically light-curable acrylic, to a glass coupler substrate. The adhesive can absorb moisture from the atmosphere and change dimensions and rigidity, thereby lowering the precision alignment and increasing signal loss. Such environmental influences must be minimized to ensure optimal component life and performance.

Several means of protecting optical components have been proposed. One approach has been to place the optical component within a solid support or container. U.S. Pat. No. 5,091,989 is directed to a process for encapsulating a component for interconnecting optical fibers wherein a bar connected to the fibers is inserted and sealed with a sealing composition into an elongated housing with a U-shaped cross-section.

U.S. Pat. No. 4,707,069 is directed to a protective arrangement for an optical fiber coupler which arrangement includes a substantially cross-sectionally V-shaped support element which forms an open channel into which a portion of the optical fiber coupler is adhesively secured. Additional adhesive bodies connect a strip-shaped support element to the bare regions of the optical fiber just outside the coupling region. Most of the length of V-shaped support element is tightly surrounded by a shrunk tubular shielding, and open ends of the V-shaped support element are closed by respective seals. Jacketed regions of the coupler are surrounded by shrunk tubular bend limiters which pass through the respective seals. This assembly is embedded in a receiving channel of a housing member with encapsulating material.

U.S. Pat. No. 4,714,316 is directed to an optical fiber unit having a protective assembly. The protective assembly includes a preformed internal protective body, an outer protective body surrounding the internal protective body, a mass of relatively soft uniting material disposed in a manner to secure the internal protective body to a preformed portion of the outer protective body, and stress relief means associated with the outer protective body enabling the fibers to extend from the internal protective body through the outer protective body so as to prevent breakage of the fibers under conditions of stress.

The above arrangements, while providing physical strength, are still susceptible to moisture and chemicals. A different approach was taken in Japanese patent application 60-107007 (the '007 application), which is directed to a manufacturing method for a fused optical fiber coupler. The method disclosed includes: removing the metal coating layer of pieces of metal-coated optical fibers; mutually fusing-adhering together the exposed portions of the optical fibers; and, immediately after fusing the exposed fibers, forming a metal reinforcing layer on the coupled portion of the optical fibers under an anhydrous atmosphere.

The metal reinforcing layer is formed in two steps. A primary metal layer is formed on the exposed portion of the fibers in a reaction container which has been evacuated and which has then had an inert gas, such as argon free from water, introduced to create an anhydrous atmosphere. The primary layer of metal is applied within the reaction container by sputtering or vacuum vapor deposition. A secondary layer of metal is then applied over the primary layer for mechanical strength. This secondary metal layer is formed by pouring molten metal around the primary metal layer or by plating.

The method of the '007 application is cumbersome to perform since much of it must be carried out in an anhydrous atmosphere and since it requires sputtering or vapor deposition equipment. The '007 application teaches that the molten metal may not be applied directly to the organic material of the coupler. The molten metal may only be applied over the primary metal layer which has been applied by sputtering or vacuum vapor deposition. Furthermore, the above method is only taught for fused optical fiber couplers, not other couplers or optical components.

Therefore, a need exists for a method of protecting optical components that minimizes moisture adsorption and chemical degradation, provides structural protection and which is relatively cheap, fast and easy to perform.

SUMMARY OF THE INVENTION

The present invention solves previously encountered problems in protecting optical components from the environment. The present inventors discovered that molten metal may be placed in direct contact with the organic material of an optical component under normal atmospheric conditions without significantly affecting the optical functioning of the component.

In one embodiment, the present invention provides a method of encapsulating an optical component, the component comprising at least partially uncoated organic material, the method comprising: placing molten metal around the optical component, and solidifying the metal. It will be appreciated that encapsulating an optical component according to the present invention includes encapsulating a segment of any optical fibers that may be connected to the optical component.

The molten metal is preferably at a temperature below the lowest degradation temperature of any element of the optical component which contacts the molten metal and of any fiber coatings which Contact the molten metal. For most optical components, a low melting metal or a low melting alloy is preferably used. As used herein, a low melting metal or alloy means a metal or alloy having a melting point below about 450° C. For planar optical fiber couplers, the molten metal is preferably at a temperature below about 350° C. and most preferably below about 150° C.

The molten metal is preferably placed around the optical component by placing the optical component in a mold and then adding the molten metal to the mold. The molten metal may be added! to the mold by methods well known to those skilled in the art, such as, for example, pouring, dipping, spraying or injection molding. The optical component may be held in place in the mold with a centering means.

If the optical component is a planar coupler, protective means, such as, for example, a clip, may be placed over at least one optical junction between an optical fiber connected to the optical fiber coupler and a light pathway of the optical fiber coupler. The protective means may cover a segment of at least one optical fiber connected to the optical fiber coupler which is not covered by a fiber coating. The protective means may cover the entire length of the optical fiber coupler, as long as organic material is still exposed.

The present invention is not limited to encapsulating an entire optical component. The present invention also encompasses sealing or encapsulating any element or segment of the optical component which possesses at least partially uncoated organic material. For example, the present invention provides a method of encapsulating an optical junction between an optical fiber and an optical component, the method comprising: placing molten metal on the optical junction, and solidifying the metal. The molten metal is preferably at a temperature below the lowest degradation temperature of any element of the optical junction, including the optical component substrate and any adhesives, and of any fiber coatings which contact the molten metal. For optical junctions in planar optical fiber couplers the molten metal is preferably at a temperature below about 350° C.

The present invention also provides for a method of sealing a surface of an optical component, the surface comprising at least partially uncoated organic material, the method comprising: placing molten metal on the surface, and solidifying the metal. The molten metal is preferably at a temperature below the lowest degradation temperature of any element of the surface. If the surface is on a planar optical coupler and contains at least one optical waveguide, the molten metal is preferably at a temperature below about 350° C.

The present invention also provides an encapsulated optical component comprising an optical component encased in metal, the optical component comprising at least partially uncoated organic material. It will be appreciated that the encapsulated optical components of the present invention include optical components connected to optical fibers, a segment of the optical fibers also being encapsulated.

The present invention also provides an optical component comprising at least one optical junction encased in metal.

It is an object of the present invention to provide a method of encapsulating an optical component which provides a high degree of protection from deleterious mechanical, chemical or other influences, including moisture adsorption.

It is an object of the present invention to provide a method of encapsulating an optical component which is inexpensive, fast and simple to perform.

It is an object of the present invention to provide a method of encapsulating an optical component which does not require sputtering, vapor deposition, anhydrous atmospheres or reduced pressures.

It is an object of the present invention to provide a method of encapsulating an optical junction.

It is an object of the present invention to provide a method of encapsulating a surface of an optical component, the surface comprising at least partially uncoated organic material.

It is an object of the present invention to provide an encapsulated optical component, the component comprising at least partially uncoated organic material.

It is an object of the present invention to provide an optical component having at least one encapsulated optical joint.

DESCRIPTION OF THE PREFERRED EMBODIMENTS

Figure 1:
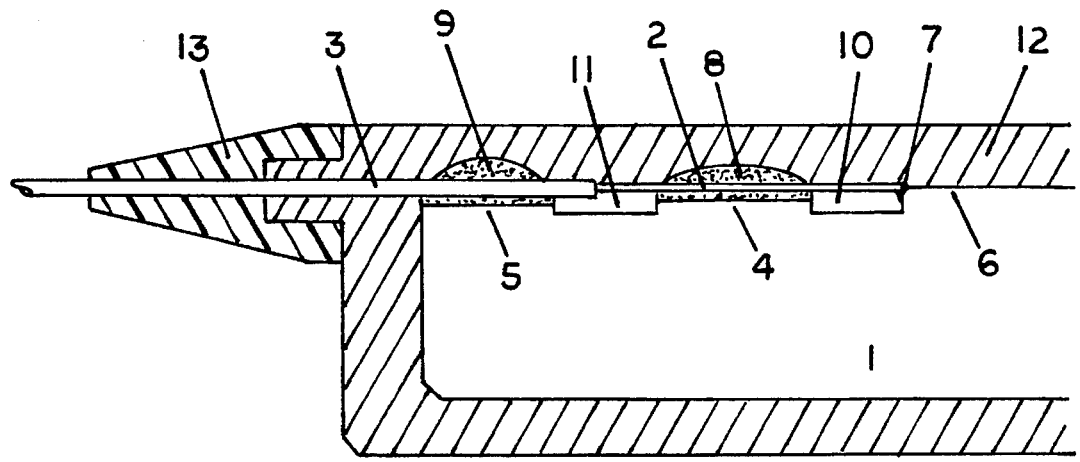
FIG. 1 illustrates a cross-sectional view of the end of an encapsulated planar optical coupler.

The present invention is based on the surprising discovery that molten metal may be placed directly around an optical component which comprises at least partially uncoated organic material without significantly affecting the optical functioning of the component. As used herein, "organic material" refers to non-metal parts of an optical component, such as, for example, glass or adhesives. Previously, metal coatings have been placed over optical fiber or over coated optical fiber by various methods (for examples see U.S. Pat. Nos. 4,609,437 and 4,485,122 and Japanese application 58-2811). These methods include sputtering and vacuum deposition, electroplating metal over an electrically conductive hermetic coating, and passing a freshly drawn pristine fiber through a body of metal-organic material flowable at a temperature below the melting point of the metal and then volatilizing the organic material off the fiber. The '007 application, cited above, provides for placing a primary metal layer on a fused optical coupler by sputtering or vacuum deposition within an anhydrous environment, and then placing molten metal over the primary metal layer. Despite these complicated methods which utilize specialized equipment, the prior art taught that placing molten metal directly on uncoated organic material of an optical component would result in loss of optical function.

The problems associated with such an operation were multiple. Metals do not easily wet glass, which is a common material for optical components. Even if a cooling molten metal could be made to wet the glass of an optical component, the metal could shrink away from the component during or after cooling, leaving unacceptable gaps in the encapsulation. Alternatively, the metal could expand during or after cooling, putting stress on the component which could break the component or distort the light path through the component (microbending). Of equal concern was the problem of thermal shock/stress. The heat from the molten metal could cause the glass elements of a component to crack or distort, resulting in significant light attenuation or complete light loss. Furthermore, if the component includes adhesives, the molten metal could reduce the rigidity of the adhesive, causing parts to misalign or disconnect. Despite these problems, the present invention provides superior protection of optical components from environmental influences without significant light attenuation and is fast, relatively inexpensive and easy to perform.

As stated previously, the metals or alloys used in the present invention preferably have a melting point below the lowest degradation temperature of any element of the optical component, including the optical component substrate and any adhesives, and below the lowest degradation temperature of any fiber coatings which contact the molten metal. This degradation temperature will vary depending on the specific optical component encapsulated and the type of fiber coatings which contact the molten metal. Above this temperature, loss of the component's optical function accelerates.

The reason for the accelerated loss of optical function above the degradation temperature again depends on the particular component. After a period of time, the heat may affect a glass element of the component, causing microbending of the light signal or even cracking of the glass. If the component has an adhesive element, the heat may, after a period of time, affect the rigidity of the adhesive, resulting in misalignment of parts. If optical fibers connected to the component have a fiber coating, the fiber coating is typically removed at some component/fiber interface point. The encapsulating metal preferably covers the bare fiber and part of the fiber coating. If the molten metal is hotter than the degradation point of the fiber coating, the heat from the molten metal may, after a period of time, melt the coating at a coating/molten metal interface.

The metals with acceptable melting points for most optical components presently used will be low melting metals or low melting alloys. Some low melting metals and alloys which have been used in the inventors experimental work are listed in Table 1. The metals or alloys are identified by their liquidus/solidus points.

It will be appreciated that the alloys which may be used in the present invention may have different liquidus and solidus points. It is preferred that the alloys used have liquidus and solidus points which are as close as possible to reduce the likelihood of unwanted shrinkage or expansion.

Along with the melting point, several other factors are important in choosing the optimal metal or alloy for a specific component. The metal or alloy should have a coefficient of thermal expansion which is compatible with the optical component it encapsulates; the metal or alloy should not exhibit significant shrinkage or expansion during or after cooling; and, the metal or alloy should be able to be removed from any mold which may be used in encapsulation.

The metals and alloys used can usually be recycled, adding to the cost effectiveness of the present invention.

In the preferred embodiment of the present invention, an entire optical component, including segments of any optical fiber connected to the optical component, is encapsulated. However, the present invention also encompasses sealing or encapsulating any element or segment of an optical component which possesses at least partially uncoated organic material. The present invention provides for partially sealing or encapsulating an optical component without the problems of component breakage or cracking, of microbending or of significant loss of light signal.

For example, the present invention encompasses encapsulating an optical junction between an optical fiber and an optical component by placing molten metal on the optical junction, and solidifying the metal. This method could be used to encapsulate the optical junction of, for example, a planar coupler. Furthermore, the present invention encompasses sealing a surface of an optical component, the surface comprising at least partially uncoated organic material, by placing molten metal on the surface and solidifying the metal. This method could be used to seal, for example, the surface of an optical coupler having one or more optical waveguides. No matter how much of an optical component is being sealed or encapsulated, the molten metal is preferably at a temperature below the lowest degradation temperature of any element which contacts the molten metal.

In one embodiment of the present method of encapsulating an optical component, the optical component is placed in a mold and molten metal is added to the mold. The mold may be made of material which will allow the encapsulated component to be removed and which will not be melted by the added molten metal. The mold is preferably made of a material with good thermal conductivity to allow for rapid cooling. For use with low-melting metals, suitable mold materials include, for example, aluminum and brass. Glass may be used to allow viewing of the molding process. The mold may be as simple as several plates held together by clips. Preferably, the mold is specifically shaped for the particular component being encapsulated.

If the component is less dense than the molten metal, it will tend to float to the top of the mold and to move off-center within the mold. This may be prevented by anchoring the component or the optical fibers connected to the component. A wetting agent may be added to reduce surface tension. Preferably, means for centering the component are utilized. The centering means may be a retractable unit, such as, for example, a screw or prong. The retractable unit is preferably retracted during cooling while the metal is still hot enough to flow over the gap left by the unit.

The metal may be poured into the mold, or alternatively, injection molding methods may be used. In placing the molten metal around the component, a major concern is thermal shock/stress. Several steps are preferably employed to reduce the risk of thermal shock/stress on the component. The mold and the optical component are preferably heated prior to adding the molten metal. Heating may be accomplished by an electric hot plate. If centering means are employed, a heating enclosure is preferably used to ensure an even temperature throughout the molds The molten metal will flow around and wet the optical component and fibers within about 2 to 10 seconds. If a centering means is employed, it may be removed at this time. The metal will still be molten and will flow to fill in any void left by the centering means. Once the optical component has been wetted, the molten metals surface tension should be high enough to prevent the component from floating to the top of the mold.

After the molten metal is added, the mold is preferably rapidly chilled. If the cooling is too slow, there may be a delay in solidification, causing defects. The mold may be opened when the metal is solid enough to hold its shape. If there is any adherence of the metal to the mold, the metal may be broken off from the mold and any edges finished.

The encapsulation process is preferably performed while the component is connected to a laser source and detection means for monitoring attenuation or other optical functions during molding.

One embodiment of a product of the present invention provides for an encapsulated planar optical fiber coupler. It will be appreciated that the encapsulated planar optical fiber couplers of the present invention include optical fiber couplers connected to optical fibers, a segment of the optical fibers also being encapsulated. Planar optical fiber couplers have been especially difficult to protect from environmental influences. Planar couplers are especially susceptible to moisture. Planar optical couplers utilize adhesive to preserve the precise alignment of optical fibers. The adhesives used readily absorb moisture from the environment. The absorbed moisture affects the strength and rigidity of the adhesives which, in turn, affects the alignment of the optical fibers and results in signal loss. Moisture can also deteriorate the glass substrate of a planar coupler. The present invention provides for an encapsulated planar coupler which has a high degree of protection from environmental influences, including moisture. The method of encapsulating the planar coupler is fast, inexpensive and easy to perform. Furthermore, the invention provides an additional stabilization of the fiber/substrate alignment.

For planar optical fiber couplers, the lowest degradation temperature is typically that of a coating on the optical fibers connected by the coupler. Thus, for planar optical fiber couplers, the molten metal should preferably be at a temperature below about 350° C. and most preferably below about 150° C.

To prevent the molten metal from contacting the junction between an optical fiber connected to the optical fiber coupler and a light pathway of the optical fiber coupler, protective means may be placed over the junction. The protective means may simply cover the junction, protecting the fiber/substrate interface and the adhesive, or it may cover additional parts of the coupler, such as, for example, that segment of the optical fiber connected to the coupler which segment is not covered by a fiber coating. The protective means may also cover the entire length of the coupler, as long as organic material is exposed. The protective means may be made of any material which will not be affected by the molten metal, such as, for example, tin or brass. The protective means is preferably a clip.

Figure 2:
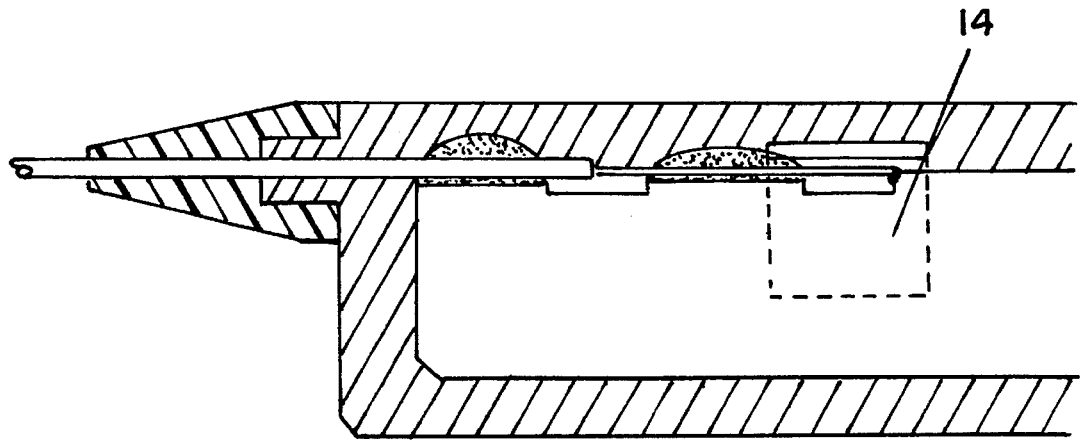
FIG. 2 illustrates a cross-sectional view of the end of an encapsulated planar optical coupler having a clip covering the junction between the endface of the fiber and the substrate.
Figure 3:
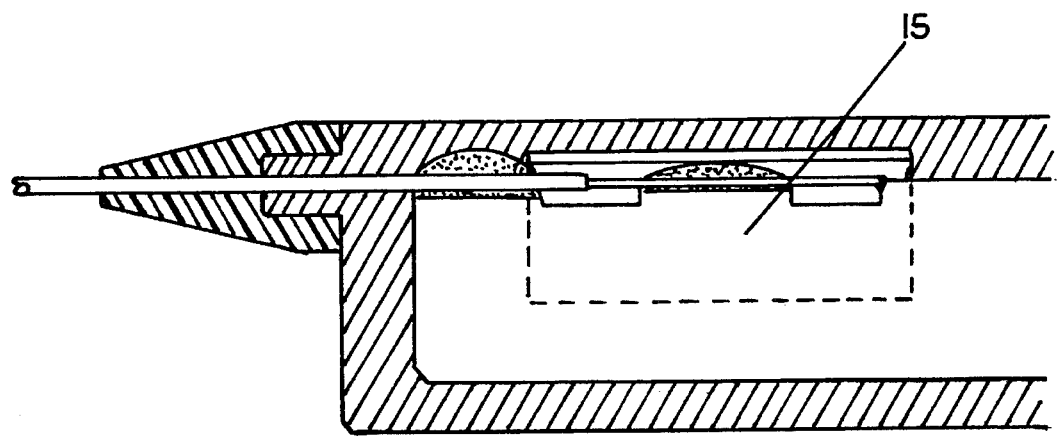
FIG. 3 illustrates a cross-sectional view of the end of an encapsulated planar optical coupler having a clip covering the entire segment of the bare fiber.

FIGS. 1–3 illustrate a cross-sectional view of encapsulated planar optical couplers. FIG. 1 shows a substrate 1, for example, formed of glass, and an optical fiber 2 which is protected by a coated portion 3. The coated portion 3 of fiber 2 is partially stripped away, and this stripped portion rests upon an inner step 4 while the coated portion rests on an outer step 5.

The endface of the fiber is joined with a waveguide 6 formed in the substrate 1 by, for example, an ion exchange technique. This junction is secured by a first drop 7 of an adhesive product having a suitable optical quality. This first drop of adhesive preferably has a small volume. A second drop 8 of an adhesive product is placed upon the fiber and the substrate 1 at inner step 4, to attach the fiber to the substrate. A third drop 9 of an adhesive product is placed upon the coated fiber and the substrate 1 at outer step 5, to attach the coated fiber to the substrate.

The three drops of adhesives 7, 8 and 9 are separated by transverse grooves 10 and 11. The entire planar coupler and part of the optical fiber are encapsulated by metal layer 12. Metal layer 12 covers the entire length of bare fiber and the three drops of adhesive 7, 8 and 9, including the junction between the endface of the fiber 2 and the substrate 1. A urethane tip 13 covers a section of the coated fiber that emanates from the metal layer 12.

FIG. 2 shows an identical encapsulated planar coupler as illustrated in FIG. 1, except that a segment of the bare fiber 2, including the junction between the endface of the fiber 2 and the substrate 1, is covered by a clip 14.

FIG. 3 shows an identical encapsulated planar coupler as illustrated in FIG. 1, except that the entire segment of bare fiber 2 is covered by a clip 15.

Figure 7:
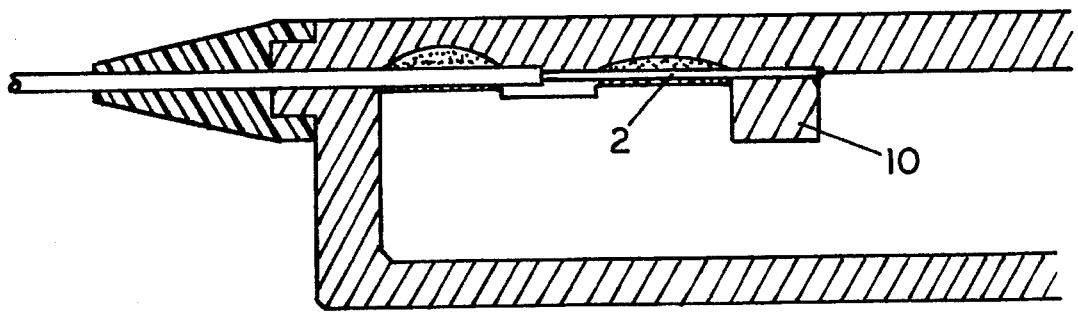
FIG. 7 illustrates a cross-sectional view of the end of an encapsulated planar optical coupler having a transverse groove of increased depth.

Because metal does not readily wet glass, the molten metal may not readily wet the glass substrate under the bare fiber. There are several possible solutions to this problem. The first approach is to increased the depth of the transverse groove over which the bare fiber travels. The increased groove area gives the metal more room to wet the glass. This first approach is illustrated in FIG. 7. The depth of transverse groove 10 under bare fiber 2 has been increased compared to the corresponding groove in the planar couplers previously illustrated.

A second approach to the problem is to place adhesive over a longer segment of exposed fiber or over the entire segment of exposed fiber. If the adhesive is placed over a longer segment of bare fiber, the metal does not have to wet as large an area under the bare fiber. If the adhesive is placed over the entire segment of exposed fiber, the metal never comes in contact with the bare fiber or the substrate under it. It will be appreciated that the present invention includes encapsulating planar optical couplers wherein the encapsulating metal does not contact the uncoated segment of fibers attached to the planar coupler. If the adhesive covered area is increased in this way, the dimension of the transverse groove is preferably diminished.

A further benefit of this second approach is that the pressure placed on the large adhesive layer by the solidified metal results in a stronger seal, preventing moisture from reaching the end of the fiber.

Figure 8:
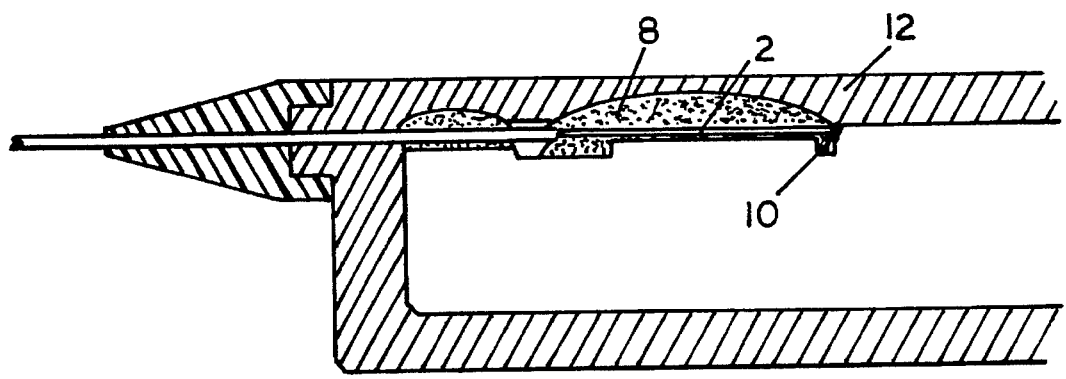
FIG. 8 illustrates a cross-sectional view of the end of an encapsulated planar optical coupler having a transverse groove of diminished size and adhesive covering the entire segment of bare fiber.

This second approach is illustrated in FIG. 8. Transverse groove 10 has a diminished size compared to the corresponding grooves of those planar couplers illustrated previously. Adhesive 8 covers the entire segment of bare fiber 2. The metal layer 12 comes into contact with the adhesive 8, but not the bare fiber 2.

EXAMPLES

Molds

As stated previously, a preferred embodiment of the method of the present invention comprises placing the optical component in a mold and then adding molten metal to the mold. It will be appreciated that the present invention encompasses any suitable mold.

The inventors have tested several specific mold designs. An initial mold was made from 4 aluminum plates. A planar coupler was placed in the center of the mold and held in place by anchoring the fibers pigtails of the coupler. Alloy 58/58 (commercially sold as ARCO 136 by Arconium Specialty Alloys, 400 Harris Ave., Providence, R.I. 02909) with a eutectic point at 58° C., was used to encapsulate the component. Although the component was successfully encapsulated, a better way of centering the component in the mold was sought.

A mold designed for the injection molding of polyurethane was successfully used next. This mold, hereinafter referred to as the "preliminary mold", comprised two symmetrical half-cavities assembled with screws. This preliminary mold possessed a centering system using a retractable screw. The centering system allowed for the centering of the component within the mold and, in turn, the encapsulating metal layer. The component had a tendency to float. This was corrected with a few drops of the aromatic urethane acrylate adhesive 050 V or a few drops of molten metal. Evaluation of different alloys was performed using this mold.

Next, several new molds were created. The objective was to provide a mold which (1) reduced the risk of fiber breakage; (2) allowed for ease of mold assembly, component molding and encapsulated component removal; (3) possessed a simple system for centering the component; (4) gave a molded product with a smooth surface; and (5) minimized the need for finishing of the molded product. To test these molds, alloy 93/93 was employed.

Figure 4:
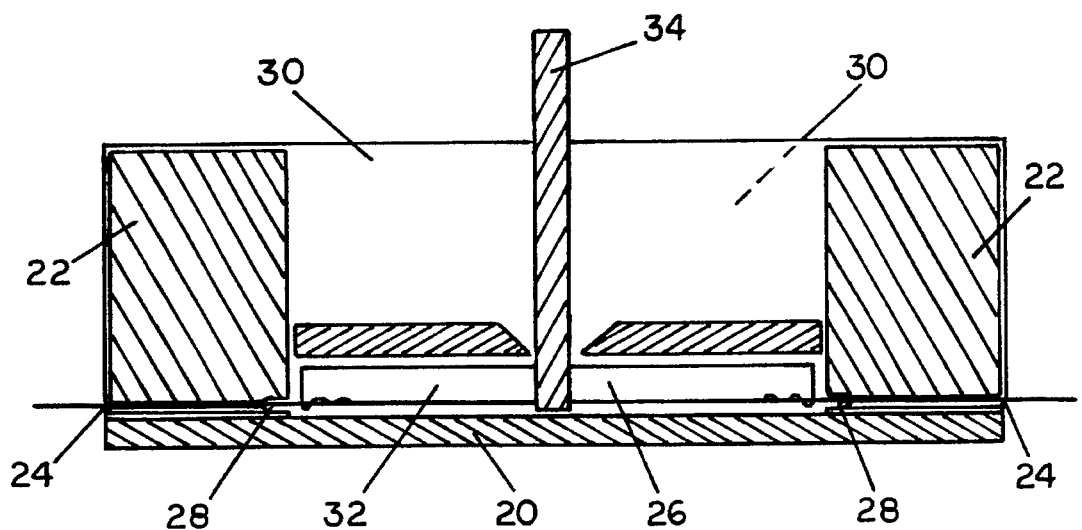
FIG. 4 illustrates a brass and glass mold having a retractable bar as a centering means.

Mold #1 was made of brass and glass with a centering means having a single centering bar. This first new mold is illustrated in FIG. 4. The mold has a brass base 20, brass endwalls 22 and glass sidewalls 30 forming a molding enclosure 32. The glass allowed for viewing during the molding process. The endwalls possess indentations 28 to provide a metal nub on the ends of the molded product for attaching urethane tips. The indentations lead to exit ports 24 which extend through the endwalls and accept fiber pigtails from the component 26. Centering means 34 consists of a retractable brass bar which is forked at the end for catching and holding the optical component.

Mold #2 was made identical to mold #1 except that the centering means of mold #2 was fixed in position.

Mold #3 was identical to mold #1, except that the sidewalls of mold #3 are made of brass.

Figure 5:
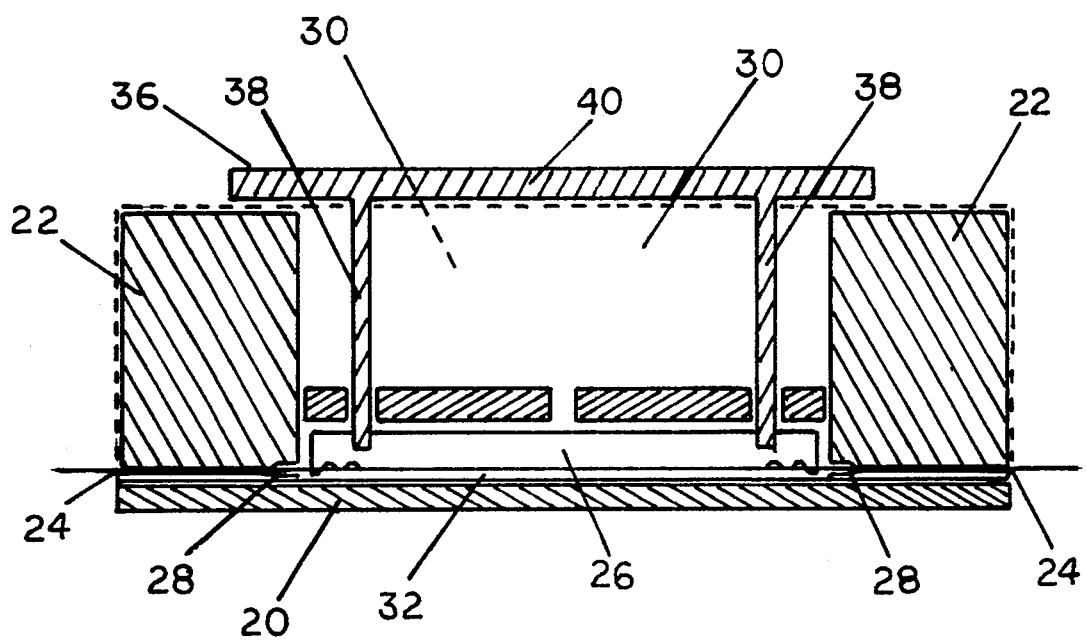
FIG. 5 illustrates a brass mold, partly in phantom, having two retractable bars as a centering means.

Mold #4 was identical to mold #3, except that mold #4 possessed a centering means having two centering bars. Mold #4 is illustrated in FIG. 5. The mold has a brass base 20, brass endwalls 22 and brass sidewalls 30 (shown in phantom) forming a molding enclosure 32. The endwalls 22 possess indentations 28 to provide a metal nub on the ends of the molded product for attaching urethane tips. The indentations lead to exit ports 24 which extend through the endwalls for fiber pigtails from the component 26 to be encapsulated. The centering means 36 consist of two brass bars 38 connected at one end to a central bar 40. The prongs may be inserted and retracted in concert via the central bar.

Molds #1 through #4 were tested by encapsulating planar couplers using alloy 93/93. All the molds successfully encapsulated the components. Mold #4 was preferred as it met all the objectives cited above. The utilization of two centering bars assured centering of the component.

It will be appreciated that, although specific molds were utilized for experimental purposes, the present invention encompasses any mold which can contain an optical component and which allows successful encapsulation of that component by the method of the present invention.

Molding Procedures

Molding procedures were performed with the molds cited above. Planar couplers were encapsulated, generally while connected to a laser source and detection device (Photodyne model 2230XFA) for the purpose of monitoring the variation of light attenuation during molding. The coupler was placed in the centering means, and then the coupler/centering means assembly was placed in the mold. The fiber pigtails from the coupler, one from each end, were inserted through the exit ports within the endwalls of the mold. The entire mold/coupler/centering means assembly was heated to 100° C. by a controlled electric heating plate, and a thermocouple was maintained in contact with the mold. The thermal input at the level of the centering means was provided by a heating enclosure. This permitted the casting of the alloy under repeatable conditions at the desired temperature level. For example, for the 93/93 alloy, the heating enclosure was at about 150° C.

After a preliminary fusion of an alloy in a beaker, the alloy was poured into the mold passing first through the heating enclosure. The required quantity was governed by the desired complete filling of the mold in order for there to be no indeficiencies when the centering means were withdrawn. The mold was then withdrawn immediately from the heating environment. After a few seconds the centering means were carefully withdrawn (the alloy still being liquid).

The mold was rapidly chilled by contact with water filled copper bottles (circulating water at about 15° C.). The mold was opened when its temperature reached below 50° C. (about 3 minutes). Opening the mold by withdrawing the caste was performed easily. If there was any adherence on the crown, it was broken off. The finishing of the coupler was obtained by separation where the centering means are positioned with the component.

Alloys

Choice of alloys depends principally on the melting temperature. Of course, the alloy may not cause damage to the different elements of a component.

To prepare the alloys, the metal components were weighed to provide 20 or 40 grams of alloy. The metal was heated in a 10 ml beaker on a heating platter. The platter was controlled to provide a temperature above the melting point of the metal component with the highest liquidus. The molten metal was stirred with a glass rod for several minutes. The molten metal was poured in a beaker and the oxidized surface skimmed off. The ingot thus obtained was cooled as governed by the required temperature determined by its composition.

Figure 6:
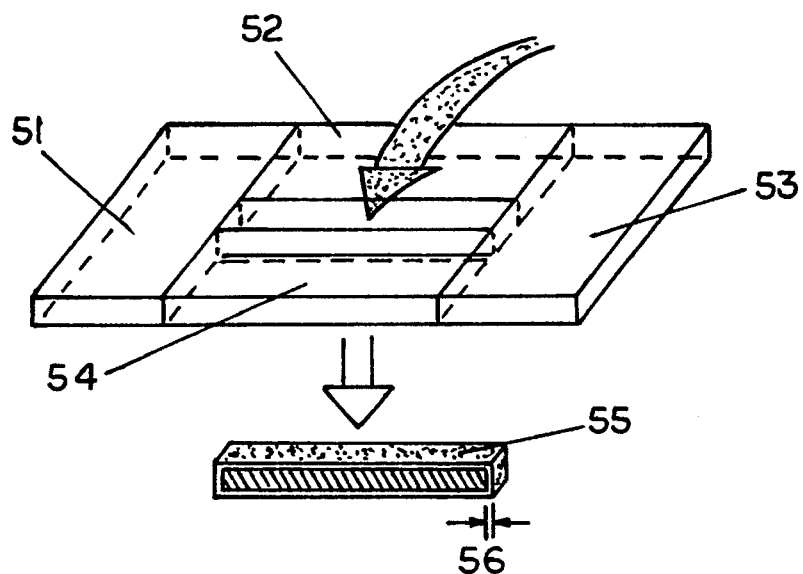
FIG. 6 illustrates four glass ceramic plates used as a mold to measure alloy expansion, and a bar of solidified alloy molded therein.

Alloys were tested for their degree of expansion or constriction after cooling with a simple procedure. As shown in FIG. 6, four 5 mm thick glass ceramic plates 51, 52, 53 and 54 where placed in contact with one another so as to form a bar-shaped mold. The plates were tensioned against each other. The alloy to be tested was cast in this mold, allowed to solidify and then sit for 60 minutes. If the alloy expanded, it moved the plates some distance. This movement produced by the expansion of the alloy after stabilization was measured to give a relative degree of expansion after cooling. Alternatively, if the alloy constricted, the molded bar shrank away from the plates, forming a gap. The gap produced by the constriction of the alloy after stabilization was measured to give a relative degree of constriction after cooling.

The alloys tested with the above-cited preliminary test and/or through overmolding of components and the compositions of these alloys are shown in Table 1. The alloys are identified by their liquidus/solidus points. Of those alloys tested, the preferred alloy for the 1×2 Corning planar couplers was found to be alloy 138/138. Alloy 138/138 is 58% Bismuth and 42% Tin. The coefficient of thermal expansion of the alloy is greater than that of the glass in the 1×2 couplers. When the alloy solidifies around the couplers it puts the glass under a slight compression. This increases the strength of the unit and decreases the chance of humidity getting in between the metal and the coupler without significant affect on the alignment of the optical joints.

Good results were also obtained in those alloys which did not contain Bismuth (Bi). Alloy 93/93 having a composition of 44% Indium (In), 42% Tin (Su) and 14% Cadmium (Cd) showed excellent results.

Optical Tests

Five 1×2 Corning planar couplers encapsulated by the method of the present invention were tested for optical loss (and hermeticity) before and after encasing them in D'Arcet's metal. The couplers were hooked to a laser source and a pin diode and the optical loss was measured at 1310 nm and at 1550 nm. The planar couplers were placed into a plastic mold and held in the mold with metal mounting pins. The entire assembly was heated on a hot plate to 105° C. D'Arcet's metal was heated separately to 120° C. The metal was poured into the mold and complete contact was assured. The entire assembly was removed from the hot plate and allowed to cool to room temperature.

The encapsulated components were placed in a humidity chamber at 85° C. and 85% relative humidity for two weeks and remeasured. The results are illustrated in Table 2. The results show no significant loss of optical function of the couplers. The information from a similar test was discarded since the plastic boxes within which the encapsulated components were stored in a humidity chamber melted on two of the three couplers tested.

Table 3 shows the results of tests performed on planar couplers encapsulated with various alloys. The couplers were encapsulated using the preliminary mold designed for injection molding polyurethane which was described previously on page 10. The encapsulated couplers were all measured for variation of attenuation monitored through port 1 by a Photodyne model 2230XFA at 1310 nm (shown at column 6 - Std. Conds.). Additionally, some of the encapsulated couplers were put through a thermal test. This test involved measuring the variation of attenuation while heating the encapsulated couplers from 20° C. to 85° C. in 5 minutes, remaining at 85° C. for 10 minutes, and then cooling the encapsulated couplers back to 20° C. in 5 minutes. One encapsulated coupler was also put through a damp heat test. This test involved measuring variation in attenuation at 60° C. and 92% relative humidity for 30 minutes.

Tests performed using alloy 93/93 on encapsulated planar couplers are shown in Table 4. The couplers were encapsulated with the different molds previously discussed herein. The couplers were encapsulated both with tin clips and without clips. Two clip sizes were utilized, a small clip covering the optical junction and a large clip covering the entire length of the top and sides of the coupler.

As with those encapsulated couplers shown in Table 3, the encapsulated couplers shown in Table 4 were put through various tests. Variation of attenuation of the encapsulated couplers was measured (shown at column 3 - Std. Conds.). After casting (dynamic) of 1×2 planar couplers with alloy 93/93 mean attenuation was 0.22 dB. Castings under the same conditions but with a clip covering the junction between the fiber and the glass substrate gave a mean attenuation of 0.10 dB. 15% of the results were disregarded due to anomalies.

Variation of attenuation was also measured during a thermal test identical to the test described above for Table 3. Damp heat tests were performed at 60° C., 93% relative humidity and/or at 85° C., 85% relative humidity. Also, some of the encapsulated couplers were put through an immersion test. This involved measuring the variation in attenuation while the encapsulated couplers was immersed in water at 85° C. for varying time limits. Several of the encapsulated couplers showed stability over immersions of 4 to 5 days.

The tests show that use of a clip may decrease loss of light signal, but placing the clip is a delicate operation.

These tests indicate that the present invention provides effective protection of optical components under strenuous conditions with little loss of light signal.

It will be appreciated that a method of encapsulating optical components and products produced by that method have been disclosed. Although the present invention has been shown and described with respect to detailed embodiments thereof, it will be understood by those skilled in the art that various changes in the form and detail thereof may be made without departing from the spirit and scope of the present invention.

TABLE 1

| Alloy | Temperatures | | Composition of the Alloy | | | | | | Prel. Test | Over- molding of Coupler |
|---|---|---|---|---|---|---|---|---|---|---|
| | Liquidus | Solidus | Pb | Sn | Bi | Ind | Cd | Zn | | |
| 58/58 | 58 | 58 | 18 | 12 | 49 | 21 | | | yes | yes |
| 95/95 | 95 | 95 | 32 | 15.5 | 52.5 | | | | yes | yes |
| 93/87 | 93 | 87 | 31.35 | 15.2 | 51.45 | 2 | | | yes | yes |
| 137/96 | 137 | 96 | 43 | 28.5 | 28.5 | | | | | yes |
| 138/138 | 138 | 138 | | 42 | 58 | | | | yes | yes |
| 115/95 | 115 | 95 | 25 | 25 | 50 | | | | yes | yes |
| 133/96 | 133 | 96 | 34 | 34 | 32 | | | | yes | |
| 167/120 | 167 | 120 | 40 | 50 | 10 | | | | yes | yes |
| 180/96 | 180 | 96 | 14.5 | 60 | 25.5 | | | | yes | |
| 118/118 | 118 | 118 | | 48 | | | 52 | | | yes |
| 130/121 | 130 | 121 | 20 | 40 | | 40 | | | yes | yes |
| 93/93 | 93 | 93 | | 42 | | 44 | 14 | | | yes |

TABLE 2

| Coupler # | Individually measured dB loss at 1310 nm (initial/@ 2 weeks) | | Individually measured dB loss at 1310 nm (initial/@ 2 weeks) | |
|---|---|---|---|---|
| | port 1 | port 2 | port 1 | port 2 |
| 626410349 | 3.75/3.77 | 3.86/3.78 | 3.91/3.93 | 3.96/3.91 |
| 626410459 | 3.96/4.01 | 3.73/3.74 | 4.12/4.06 | 3.93/3.88 |
| 626410309 | 3.68/3.76 | 3.72/3.75 | 3.81/2.88 | 3.89/3.91 |
| 626410319 | 3.82/3.79 | 3.86/3.77 | 4.00/3.98 | 3.91/3.88 |
| 626410499 | 3.77/3.93 | 3.85/4.02 | 3.86/3.91 | 3.99/3.95 |

TABLE 3

| Ref. | Type of Mold Utilized | Clip Utilized | | | Variation of Attenuation in dB (port 1) | | |
|---|---|---|---|---|---|---|---|
| | | Without | Small | Large | Std. Conds. | Therm. Test | Damp Heat |
| 58/58 | prelim. | X | | | 0.08 | | 0.04 |
| 93/87 | prelim. | | | X | 1.15 | | |
| | | | | X | 4.20 | | |
| | | | | X | 0.10 | | |
| 95/95 | prelim. | X | | | 6.5 | | |
| | | | | X | 1.8 | | |
| | | | | X | 1.8 | | |
| 115/95 | prelim. | X | | | 5.05 | | |
| 118/118 | prelim. | X | | | 0.40 | (0.70) | |
| | | | X | | 0.45 | | |
| 130/121 | prelim. | X | | | 2.11 | (0.56) | |
| 137/96 | prelim. | X | | | 3.40 | (0.10) | |
| 138/138 | prelim. | X | | | 0.47 | (1.06) | |
| 167/120 | mold #3 | X | | | 0.48 | (0.35) | |

TABLE 4

| Clip Employed | Mold Utilized | Variation of Attenuation in dB | | | Immersion at 85 C. | |
|---|---|---|---|---|---|---|
| | | Std. Conds. | Therm. Test | Damp Heat | dB Loss | Time |
| large | prelim. | 0.90 | (0.83) | | | |
| large | prelim. | 0.41 | (0.60) | | | |
| small | prelim. | 0.13 | (0.28) | | | |
| small | prelim. | 0.70 | (0.02) | | | |
| small | prelim. | 0.01 | (0.03) | | (0.96) | 15 mn |
| without | mold #3 | 0.20 | | | (0.40) | 5 days |
| without | mold #3 | 0.38 | (0.10) | | (0.05) | 5 h. |
| large | mold #2 | 0.14 | | | (0.01) | 1 days |
| without | mold #3 | 0.33 | (0.07) | | | |
| without | mold #1 | 0.16 | (0.30) | | | |
| without | mold #1 | 0.35 | (0.12) | | | |
| without | mold #1 | 0.16 | (0.28) | | | |
| small | prelim. | 0.30 | (0.13) | | | |
| small | prelim. | 0.25 | (0.45) | | | |
| without | mold #3 | 0.26 | (0.21) | | (0.32) | 1 day |
| without | mold #3 | 0.05 | (0.02) | | | |
| | prelim. | 0.00 | (0.00) | (0.51) | | |
| small | prelim. | 0.03 | (0.01) | (0.40) | | |
| small | prelim. | 0.06 | (0.04) | (0.26) | | |
| small | prelim. | 0.02 | (0.03) | (0.49) | | |
| small | prelim. | 0.10 | (0.04) | (0.55) | | |
| small | prelim. | 0.06 | (0.07) | (0.70) | | |
| small | prelim. | 0.03 | (0.05) | | | |
| without | prelim. | 0.32 | (0.30) | | | |
| without | prelim. | 0.34 | (0.02) | (0.17) | | |
| without | prelim. | 0.26 | (0.21) | (0.29) | | |
| without | prelim. | 0.07 | (0.06) | (0.23) | | |
| without | mold #4 | 0.30 | (0.26) | | (0.01) | 2 days |
| without | mold #4 | 0.50 | (0.07) | | (0.14) | 5 days |
| without | mold #4 | 0.35 | | | | |
| without | mold #4 | 0.07 | | | | |

We claim:

1. An encapsulated optical component comprising:
    an optical component encased in low-melting metal, the optical component prior to encapsulation comprising at least partially uncoated organic material, in which the low-melting metal is selected from the group consisting of the following alloys and mixtures thereof: 58/58, 95/95, 93/87, 137/96, 138/138, 115/95, 133/96, 167/120, 180/96, 118/118, 130/121, and 93/93.

2. The encapsulated optical component of claim 1, wherein the optical component is an optical fiber coupler.

3. The encapsulated optical component of claim 1, wherein the optical component is a planar coupler.

4. The encapsulated optical component of claim 1, wherein the metal is selected from the group consisting of alloy 93/93 and alloy 138/138.

5. An encapsulated optical planar coupler comprising:
    an optical planar coupler encased in metal, the optical planar coupler prior to encapsulation comprising at least partially uncoated organic material, further comprising:

protective means covering at least one junction between an optical fiber connected to the planar coupler and a light pathway of the planar coupler.

6. The encapsulated planar coupler of claim 5 wherein the protective means cover that segment of at least one optical fiber connected to the planar coupler which segment is not covered by a fiber coating.

7. The optical component of claim 1 further comprising:

at least one optical junction encased in metal.

* * * * *